UNITED STATES PATENT OFFICE.

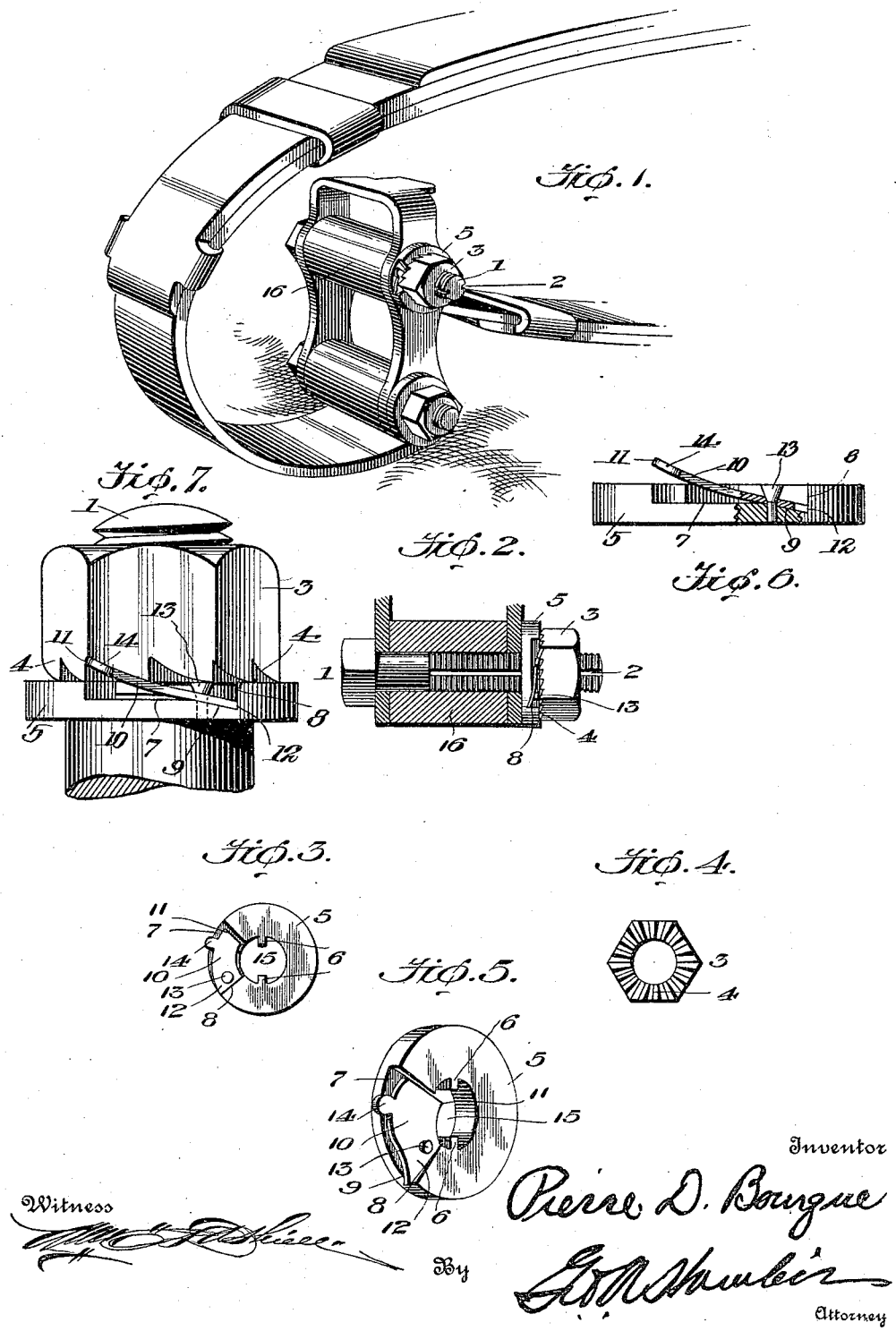

PIERRE D. BOURQUE, OF EAST LONG MEADOW, MASSACHUSETTS.

NUT-LOCK.

1,184,512.   Specification of Letters Patent.   Patented May 23, 1916.

Application filed August 4, 1915. Serial No. 43,561.

*To all whom it may concern:*

Be it known that I, PIERRE D. BOURQUE, a subject of the King of England, residing at East Long Meadow, in the county of Hampden and State of Massachusetts, have invented certain new and useful Improvements in Nut-Locks, of which the following is a specification.

This invention relates to nut locks.

My object is to provide an improved nut lock wherein the nut may be locked after even small adjustment and will remain in securely locked condition until manually released, thereby preventing accidental loosening or backing off of the nut due to jars or vibration.

The present invention relates to a nut lock embodying a washer having a plurality of keys adapted to be received in longitudinal grooves or channels in the bolt; an improved spring pawl carried by and related to the washer in a novel manner and itself of improved construction; and an improved device, preferably a rivet, for holding the pawl to the washer and projecting in such manner that the toothed nut which is locked by the pawl also coöperates with the projecting member or rivet and braces and assists in holding the pawl to the washer without interfering with the action of the free end of the pawl.

The invention consists, still further, in means, such as a shoulder, on the washer coöperating with and bracing the anchored end of the pawl and, also, a finger piece projecting from the pawl whereby it may be disengaged from the teeth on the nut.

My nut lock may be modified and I do not, therefore, limit myself to the precise details of construction hereinafter set forth and disclosed in the drawing, such disclosure being illustrative rather than restrictive of the scope of the invention.

In the accompanying drawings: Figure 1 is a perspective showing the invention applied to the spring of an automobile. Fig. 2, a side elevation with the end of the spring in section. Fig. 3, a face view of the washer. Fig. 4, a similar view of the face of the nut, Fig. 5, a detailed perspective of the washer and spring pawl. Fig. 6, an enlarged edge view, partly in section, showing the pawl and its fastening; and Fig. 7, an enlarged side elevation of the nut, bolt and washer when locked.

The bolt 1 is provided with longitudinally extending key seats or channels 2 on opposite sides thereof, running from its tip inwardly.

The nut 3 is of the usual form except that its inner face is provided with numerous teeth 4.

The washer 5 has diametrically opposite keys or lugs 6 adapted to enter the key seats 2. By providing two keys and seats I thereby prevent looseness of the washer on the bolt and double the strength of the connection between them and also prevent catching of the lugs on the threads or injury to the latter. A recess 7 is provided in one face of the washer 5, there being a shoulder 8 at one end of said recess and the bottom of the recess being beveled or inclined from the said shoulder 8 for a short distance in the direction of the length of said recess, as shown at 9. The spring pawl 10, which is relatively broad to give it strength is provided on its free end with a turned or angular portion or tooth 11 to engage the teeth 4, has its other end 12 lying against and conforming to the beveled or inclined portion 9 and fastened to the bottom of the recess 7 at said beveled portion, by a member 13, which is preferably a rivet. That portion of the pawl 10 which lies against the beveled part 9 is securely anchored by the rivet 13, but the remaining portion of said pawl is free to spring outwardly or inwardly, as shown in Fig. 2. The rivet 13 projects from the face of the pawl 10 for such a distance that the teeth 4 will bear against the end of the rivet when the nut is securely tightened against the washer, as shown in Fig. 2. When in this position, the nut reinforces the holding action of the rivet 13 and stiffens the anchored end of the spring, thus strengthening the spring and minimizing any danger of buckling of said spring and resisting the tendency of such buckling to draw outwardly on the head of the rivet and loosen the latter. The shoulder 8 against which the end of the spring pawl 10 abuts also strengthens the connection of the spring pawl with the washer. These functions do not, in any manner, interfere with the freedom for movement of the end of the pawl which carries the tooth 11. The pawl 10 is provided with a projection or lug 14 which extends beyond the periphery of the washer 5 in position for convenient manipulation by a tool when it is desired to release the pawl from the nut. The inclined portion 9 and the rivet or fastening 13 throw the free end of the spring toward the nut and add stiffness to the spring pawl which it would not possess were such inclined portion 9 absent because a certain portion of the length of the spring pawl is thus anchored to the washer.

Preferably the recess 7 extends the whole distance from the aperture 15 to the periphery of the washer and the spring pawl 10 is made of nearly the same width as said recess to afford as much strength to the pawl as possible.

By providing numerous teeth on the face of the nut 3 I am enabled to lock the nut on any slight rotation thereof.

In Fig. 1 the invention is shown as applied to the ends of a vehicle spring, such, for instance, as used on an automobile. This is merely illustrative of the invention which can be put to any use. Referring to Fig. 2, the portion 16 of the spring through which the bolt 1 passes is flanked on one side by the head of the bolt and on the other side by the washer 5 which can be held against rotation on the bolt by the seats and keys, regardless of the position of the washer, as the seats 2 extend for a considerable distance lengthwise of the bolt. Wherever the washer finds an abutment, the nut can be screwed up tight and will then be automatically locked by the pawl 10.

Having thus described my invention, what I claim as new and desire to secure by Letters Patent is:

In a nut lock, the combination with a bolt having a longitudinally extending seat, of a flat washer provided with a key received in said seat, and having a transverse recess extending across one side of its outer face, said recess having a square shoulder at one end and an incline or declivity in the bottom of its recess immediately adjacent said shoulder, a relatively broad leaf-spring-pawl disposed in said recess and having one end portion lying against and conforming to the incline or declivity aforesaid and provided with a straight transversely disposed edge abutting the square shoulder, a single fastening member passing through the end portion of the pawl and securing it against the incline or declivity and holding the transversely disposed edge of the pawl against the shoulder, said fastening member having a head projecting freely from the face of the pawl to a point substantially in the plane of the outer face of the washer, the remaining portion of the pawl being free and provided with a nut-engaging tooth and also having a laterally outstanding lug for purposes of retraction of said pawl, and a nut provided with numerous teeth on its face arranged so that a certain one thereof will engage the projecting end of the fastening member when the nut is secured tight against the washer while another tooth of said nut is engaged by the tooth of the pawl, said fastening member being adapted to resist outward buckling of the spring pawl when the latter is locked to the nut.

In testimony whereof I affix my signature.

PIERRE D. BOURQUE.

Copies of this patent may be obtained for five cents each, by addressing the "Commissioner of Patents, Washington, D. C."